United States Patent

Minamida et al.

[11] Patent Number: 5,391,856
[45] Date of Patent: Feb. 21, 1995

[54] COOLING DRUM FOR CASTING THIN CAST PIECES AND METHOD AND APPARATUS FOR FORMING DIMPLES IN PERIPHERAL SURFACE OF THE DRUM

[75] Inventors: Katsuhiro Minamida; Motoi Kido, both of Sagamihara; Fumihiko Nishizawa, Kitakyushu, all of Japan

[73] Assignee: Nippon Steel Corporation, Tokyo, Japan

[21] Appl. No.: 927,645
[22] PCT Filed: Jan. 9, 1992
[86] PCT No.: PCT/JP92/00006
§ 371 Date: Sep. 9, 1992
§ 102(e) Date: Sep. 9, 1992
[87] PCT Pub. No.: WO92/11960
PCT Pub. Date: Jul. 23, 1992

[30] Foreign Application Priority Data

Jan. 11, 1991 [JP] Japan .................. 3-012687
Jun. 3, 1991 [JP] Japan .................. 3-157421

[51] Int. Cl.[6] ............................................. B27K 26/00
[52] U.S. Cl. .................. 219/121.68; 219/121.69; 219/121.82
[58] Field of Search ............ 219/121.68, 121.69, 219/121.82, 121.74

[56] References Cited

U.S. PATENT DOCUMENTS 4,947,023  8/1990  Minamida et al. .......... 219/121.68

FOREIGN PATENT DOCUMENTS 0309247  3/1989  European Pat. Off. .
0396862  11/1990  European Pat. Off. .
463177  1/1992  European Pat. Off. .

Primary Examiner—C. L. Albritton
Attorney, Agent, or Firm—Pollock, Vande Sande & Priddy

[57] ABSTRACT

A cooling drum for use in casting a thin cast strip is rotated about its axis while a laser beam having a wavelength of from 0.30 $\mu$m to 1.07 $\mu$m is irradiated onto a peripheral surface of the drum to form dimple therein. At this time, at least one of the oscillation period of the laser beam, the laser output and the divergence angle of the beam is controlled to assure that each dimple has a depth of no less than 50 $\mu$m and a diameter of less than 500 $\mu$m and the distance measured between the centers of each adjacent pair of dimples ranges from 1.05 times to 5 times the dimple diameter. At least one of the steps of adjusting the oscillation period of the laser beam and causing the laser beam to scan the peripheral surface of the drum in the axial direction thereof is conducted to cause a irregular deviation of less than 20% in the density of distribution of the thus formed dimples, whereby the formation of waves in the surface of the molten metal placed in contact with the drum during the casting of the thin cast piece is suppressed, to thereby assure a continuous casting of thin cast piece having good surface characteristics and condition.

13 Claims, 5 Drawing Sheets

$(X, Y) = (x_i - x_j, y_i - y_j)$

COOLING DRUM FOR CASTING THIN CAST PIECES AND METHOD AND APPARATUS FOR FORMING DIMPLES IN PERIPHERAL SURFACE OF THE DRUM

TECHNICAL FIELD

This invention relates to a cooling drum for use in a twin-drum process, a single-drum process, a drum-belt process or the like for continuously casting thin cast strip and to a method and apparatus for forming dimples in the peripheral surface of the cooling drum.

BACKGROUND OF THE INVENTION

In the field of continuous casting, there is a strong demand for the development of a technique for manufacturing directly from a molten metal a thin cast strip having a shape generally equal to a finished shape of sheet metal for the purpose of reducing the manufacturing cost, creating new metals, and so on. To meet this demand, various methods, for example, a twin-drum method using a pair of cooling drums with internal water-cooling mechanisms, a single drum method using one cooling drum and a drum-belt method based on the formation of a meniscus between a cooling drum and a belt, have been proposed and some of them have been improved to such a level as to be industrially practicable.

In these continuous casting methods, it is important to stably maintain surface characteristics of a thin cast strip at a high level. That is, continuous casting methods of this kind have been developed with the aim of obtaining a thin cast strip which is capable of reducing the rate of rolling in a subsequent step unlike slabs manufactured by the conventional continuous casting facilities. Therefore, if there is a variation in the thickness of a thin cast strip, a crack in the surface thereof, or the like, it would remain as a defect in the surface of the product and there is a considerable risk of impairing the value of the product on the market.

Various methods have therefore been studied and proposed to stably manufacture thin cast strips having good surface qualities. For example, a method of forming irregularities in the peripheral surface of a cooling drum to form air gaps between a cast metal and the cooling drum has been proposed in Japanese Unexamined Patent Publication No. 60-184449. The heat removing capacity of the cooling drum is reduced by the air gaps so that the molten metal is slowly cooled. Consequently, the thickness of the solidified shell is made uniform in the widthwise direction of the shell and it is possible to manufacture a thin cast strip having improved shape characteristics.

However, if a thin cast strip is manufactured by using a cooling drum having surface irregularities or dimples formed in its peripheral surface, transverse creases may be easily formed in the surface of the obtained cast strip. The cause of this phenomenon will be described below with reference to the drawings.

FIG. 5 shows a meniscus portion of one of two cooling drums of a twin drum type continuous casting machine. The same problem is encountered in the case of the single drum process or the drum-belt process.

Molten metal 4 injected into a basin 3 is vibrated by surface irregularities or dimples 2 formed in the peripheral surface of a cooling drum 1 to cause surface waves 5. As the cooling drum 1 is rotated in the direction of arrow A, the molten metal 4 is cooled by the peripheral surface of the cooling drum 1 to form a solidified shell which is fed into the drum gap.

If surface waves 5 occur in the molten metal surface during this process, the state of contact between the molten metal 4 and the peripheral surface of the cooling drum 1 is deteriorated, so that irregular gaps are easily formed at the interface. These gaps act to cause a reduction in the rate of heat transfer to the cooling drum 1, causing irregular changes in the growing speed of the solidified shell and the cooling speed in the lengthwise direction of the cast strip.

Transverse creases are therefore formed in the resulting thin cast strip. Also, even if the generation of transverse creases can be avoided, the heat history of the thin cast strip is locally changed since the conditions of the growth and cooling of the solidified shell are varied by surface waves 5.

Variations in the heat history caused in this manner result in non-uniformity of the gloss of the product surface and a coarse crystalline structure and so on and considerably reduce the value of the product on the market particularly in the case of a stainless steel thin plate or the like whose surface characteristics is considered to be particularly important. It has been found that the diameter and the depth of dimples 2 and the distance between the centers thereof relate greatly to surface waves 5 and that an effect of suppressing surface wave 5 can be obtained by reducing the diameter, increasing the depth and reducing the distance.

Detailed studies made by the inventors have revealed that the occurrence of surface waves can be suppressed by eliminating the periodicity of the dimple distance, for example, by irregularly setting the distance between the dimples. In this case, analysis of the distribution density of the dimple positions is effective as a method for confirming the irregularity. The distribution density referred to herein is the density of probability of the existence of dimples in immediate proximity to any dimple as defined by setting X-axis in the drum axial direction and Y-axis in the drum circumferential direction on the drum peripheral surface, as shown in FIG. 7, and by plotting the difference (X, Y) between arbitrary dimple position (Xi, Yi) and the position (Xj, Yj) of a dimple in immediate proximity thereto with respect to $\Theta = \text{Tan}^{-1}(X/Y)$. FIG. 8 shows results of this analysis. In contrast, if there are regularities, different results are obtained from different kinds of regularities as discussed below. FIG. 9 shows an analysis result from case where there is a periodicity in the drum surface axial direction, and FIG. 10 shows an analysis result from a case where there is a periodicity in the drum circumferential direction.

However, dimples 2 of this kind have ordinarily been formed by etching and it has therefore been difficult to set a small dimple diameter and a large dimple depth simultaneously. Also, it has been practically impossible to freely change the dimple distance because of large burdens in terms of time and cost.

SUMMARY OF INVENTION

A first object of the present invention is to provide a method of forming a multiplicity of dimples in the peripheral surface of a cooling drum for casting a thin cast strip in which the diameter and the depth of dimples to be formed and the distance between the dimples can be suitably controlled.

A second object of the present invention is to provide a dimple forming apparatus used to practice the method provided to achieve the first object.

A third object of the present invention is to provide a cooling drum for casting thin cast strip which drum has dimples formed at desired controlled distances.

A fourth object of the present invention is to provide a dimple forming method used to achieve the third object.

A fifth object of the present invention is to provide a dimple forming apparatus used to practice the method provided to achieve the fourth object.

To achieve the first object of the present invention, there is provided a dimple forming method comprising the steps of:

rotating a drum about an axis thereof;

irradiating the peripheral surface of the drum with at least one laser beam having a wavelength of 0.30 to 1.07 $\mu m$ to form dimples in the peripheral surface; and controlling at least one of the oscillation period of the laser beam, the laser output and the beam divergence angle so that each dimple has a depth of no less than 50 $\mu m$ and a diameter of not greater than 500 $\mu m$ and so that the distance between the centers of each adjacent pair of the dimples ranges from 1.05 times to 5 times the dimple diameter.

To achieve the second object of the present invention, there is provided a dimple forming apparatus comprising:

drive means for rotating a drum about an axis thereof;

at least one laser oscillator for outputting a laser beam having a wavelength of 0.30 to 1.07 $\mu m$;

a processing head having at least one bending mirror and at least one focusing lens, the processing head directing the laser beam from the laser oscillator to the peripheral surface of the drum during the rotation of the drum to form dimples in the peripheral surface; and movement means for moving the processing head in the axial direction of the drum.

To achieve the third object of the present invention, there is provided a drum in which a multiplicity of dimples are formed in its peripheral surface, the depth of each dimple is no less than 50 $\mu m$, the diameter of each dimple is not greater than 500 $\mu m$, and the distance between the centers of each adjacent pair of the dimples ranges from 1.05 times to 5 times the diameter of the dimple, and in which the density of distribution of dimples expressed in terms of the probability of the existence of dimples in immediate proximity to any dimple has an irregular deviation which is no more than 20%.

To achieve the fourth object of the present invention, there is provided a dimple forming method comprising the steps of:

rotating a drum about an axis thereof;

irradiating the peripheral surface of the drum with at least one laser beam having a wavelength of 0.53 to 1.07 $\mu m$ during the rotation of the drum to successively form dimples in the peripheral surface; and causing an irregular deviation in the density of distribution of the formed dimples by performing at least one of modulating the oscillation period of the laser beam and scanning the peripheral surface of the drum with the laser beam in the axial direction of the drum.

To achieve the fifth object of the present invention, there is provided a dimple forming apparatus comprising:

drive means for rotating the drum about an axis thereof;

at least one laser oscillator for outputting a laser beam having a wavelength of 0.53 to 1.07 $\mu m$;

optical means for directing the laser beam from the laser oscillator to the peripheral surface of the drum during the rotation of the drum to successively form dimples in the peripheral surface;

laser modulation means for modulating the oscillation period of the laser beam by controlling the laser oscillator;

scanning means for scanning the peripheral surface of the drum in the axial direction thereof with the laser beam directed to the peripheral surface of the drum; and a scan controller for controlling the scanning means;

wherein at least one of the modulation of the oscillation period of the laser beam and the scanning of the peripheral surface of the drum in the axial direction of the drum is performed to cause an irregular deviation in the density of distribution of the dimples to be.

BEST MODE FOR CARRYING OUT THE INVENTION

Figure 1:
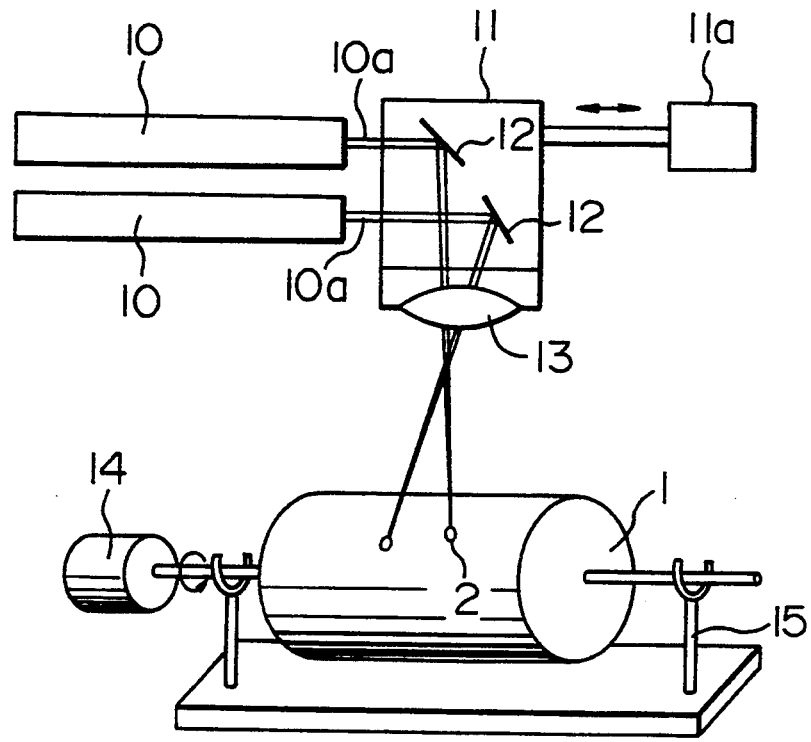
FIG. 1 is a schematic diagram of a first embodiment of a dimple forming apparatus in accordance with the present invention.

Referring to FIG. 1, a drum 1 having a peripheral surface in which dimples 2 are to be formed is rotatably supported by drum receivers, such as support members 15 and is driven and rotated by a drive mechanism 14. The peripheral surface of the drum 1 is irradiated with pulsed laser beams by a laser unit having two laser oscillators 10. Laser beams 10a from these laser oscillators 10 enters a working head 11 which can be reciprocatingly driven in the axial direction of the drum 1 by a reciprocally driving unit 11a. Two bending mirrors 12 are provided in the processing head 11 and serve to respectively reflect the two laser beams to a focusing lens 13 in the processing head 11. The focusing lens 13 condenses the laser beams 10a from the mirrors 12 onto the peripheral surface of the drum 1 while the drum 1 is being rotated by the drive mechanism 14, thereby forming dimples 2 in the peripheral surface. At this time, the processing head 11 is reciprocatingly moved in the axial direction of the drum 1 by the reciprocally driving unit 11a. The formed dimples 2 are therefore distributed in both the circumferential and axial directions of the drum 1. The operation of the reciprocally driving unit 11a is controlled by an unillustrated computer to enable dimples 2 to be disposed in a desired pattern.

When dimples 2 are formed, conditions described below are controlled so that the diameter and the depth of the dimples to be formed and the arrangement of dimples 2 (distances between the dimples) can be controlled.

A wavelength of 0.30 to 1.07 μm is selected as the wavelength of the laser beams 10a. This is because the drum 1 to be worked is ordinarily formed of copper, aluminum or nickel, the absorption coefficient is too low with respect to laser beam having a wavelength of 1.07 μm or longer to achieve efficient processing and because, at a wavelength of 0.30 μm or shorter, working is mainly effected based on a chemical reaction in the working process unlike the thermal working by laser having a wavelength of 0.30 μm or longer, so that working cannot be performed efficiently.

The positions at which dimples 2 are formed can be determined with regularity or irregularity by controlling the period of oscillation of the laser beams. This is effective to suppress occurrence of surface waves in a molten metal.

The laser output is proportional mainly to the depth of dimples, and surface waves have a negative correlation with the dimple depth. Accordingly, controlling the laser output is effective to suppress surface waves.

The beam divergence angle and the worked dimple diameter are generally in direct proportion to each other, and the dimple diameter has a negative correlation with the occurrence of surface waves. Accordingly, controlling the beam divergence angle is effective to suppress surface waves.

Figure 3:
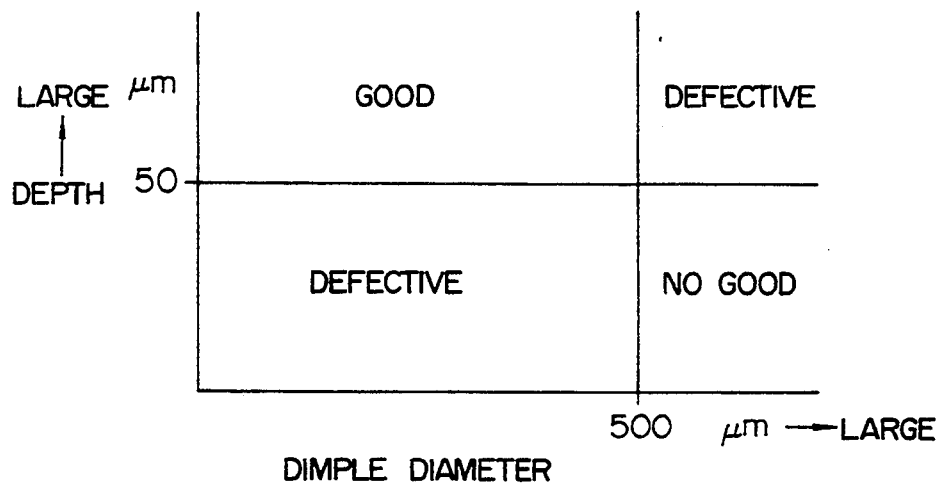
FIG. 3 is a diagram showing the relationship between the diameter and the depth of dimples with respect to the suppression of the occurrence of surface creases.

It can be understood that suitable conditions of the diameter and the depth of dimples with respect to surface waves are such that, as shown in FIG. 3, surfaces waves can be suppressed particularly when the dimple diameter is 500 μm or less and the depth is 50 μm or more.

In this case, if the distance between the centers of dimples 2 is not greater than 1.05 times the dimple diameter, the area of contact between the molten metal and the drum is so small that the rate at which heat is transferred from the molten metal to the drum 1 is not high enough to enable the solidified shell to grow with stability. If the distance between the centers of dimples 2 is not smaller than 5 times the dimple diameter, the effect of slowly removing heat from the molten metal, such as the effect of dimples 2 on the drum, cannot be obtained. Therefore, the distance between dimples 2 should be within the range of from 1.05 to 5 times the dimple diameter.

A method for positively controlling the positions of dimples 2 so as to effectively suppress generation of surface waves may be to arrange a plurality of laser oscillators 10 and control the oscillation period of each laser oscillator as shown in FIG. 1 or to use one laser oscillator and oscillate the condensing system at a high speed.

Figure 2:
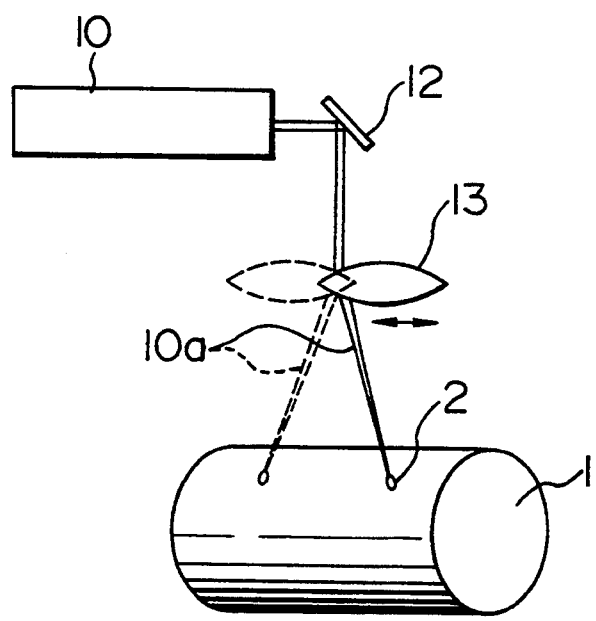
FIG. 2 is a schematic diagram of a modification of the dimple forming apparatus shown in FIG. 1.

In a modification shown in FIG. 2, one laser oscillator 10 is used and a lens 13 is placed eccentrically with respect to a laser beam 10a and rotated at a high speed to control the positions of dimples 2 formed.

Figure 4:
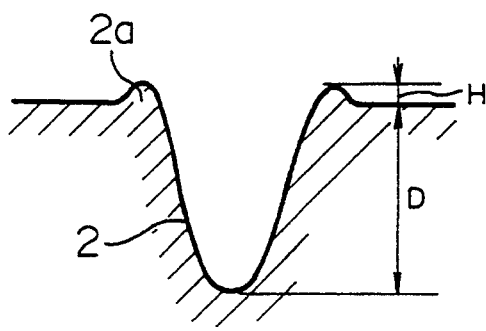
FIG. 4 is an enlarged diagram of a dimple formed in accordance with the present invention.
Figure 5:
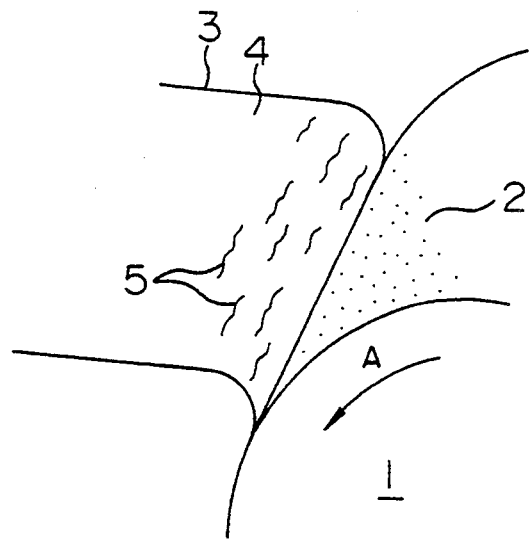
FIG. 5 is a perspective view showing the state of a surface of a molten metal adjacent a meniscus formed in the continuous casting of a thin cast piece using the conventional cooling drum.

Referring to FIG. 4, a rim 2a around dimple 2, which is formed of the material melted, evaporated and scattered and which characterizes laser heat working, causes a considerable deterioration in surface characteristics of the thin cast strip. However, it has been found that it is possible to set the height H of rim 2a around dimple 2 to 1/50 or less of the dimple depth D by controlling the laser output energy, the pulse width of laser and the beam divergence angle so that the output energy is 30 to 100 mJ, the pulse width is about 100 nsec and the divergence angle is 3 mrad or smaller, and that, when this control is effected, there is no problem with respect to the surface characteristics of thin cast strip.

EXPERIMENTAL EXAMPLE 1

To form dimples 2 on a drum 1 for casting thin cast strip, laser beams from four YAG lasers having energy outputs of 70, 80, 90 and 100 mJ per pulse, 500 pulses/sec and a divergence angle of 3 mrad respectively were led to a focusing lens (f=100 mm) at 20 degrees, and the drum peripheral speed was controlled so that the distances between the centers of dimples were 200 to 250 μm.

Dimples 2 having diameters 120, 150, 170 and 180 μm, a depth of more than 100 μm and a rim height of 1 μm could be formed in the peripheral surface of the drum 1, and thin cast strip having thickness of 5 mm and having good surface characteristics were manufactured by using this drum.

EXPERIMENTAL EXAMPLE 2

In forming dimples 2 on a drum 1 for casting thin cast strip, laser beams from four alexandrite lasers each having an energy output of 80 mJ per pulse, 10 pulses/sec and a divergence angle of 3 mrad were led to a focusing lens (f=50 mm)

Dimples 2 having diameters of 100 μm, depth of 200 μm, dimple-center distances of 120 to 150 μm and a rim height of 3 μm could be formed in the peripheral surface of the drum 1, and thin cast strip having thickness of 5 mm and having good surface characteristics were manufactured by using this drum.

Figure 6:
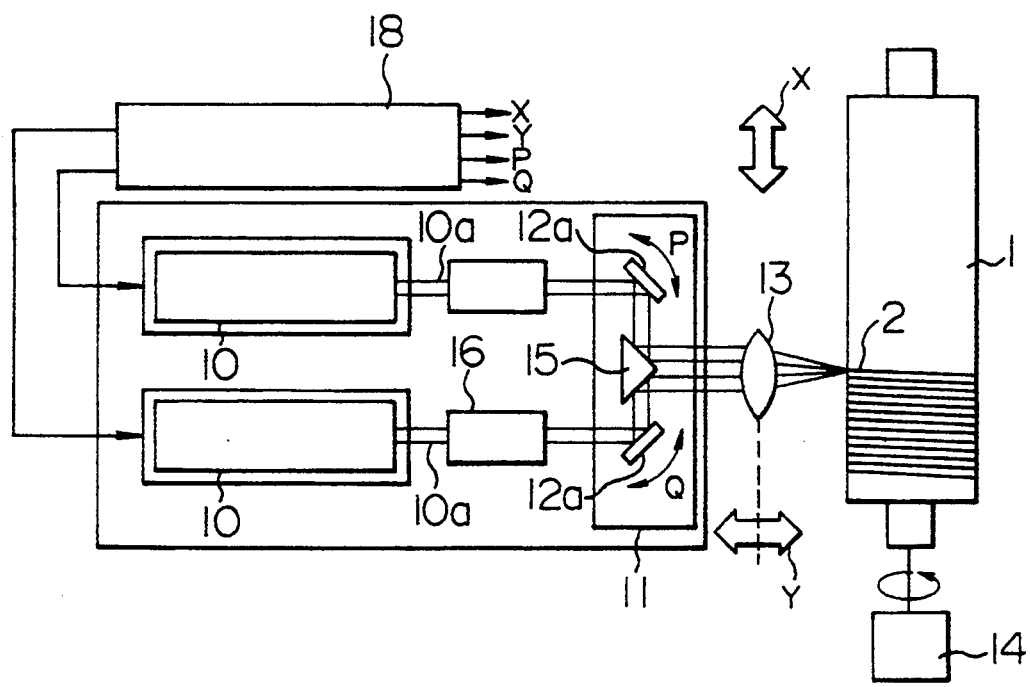
FIG. 6 is a schematic diagram of a second embodiment of the dimple forming apparatus in accordance with the present invention.
Figure 7:
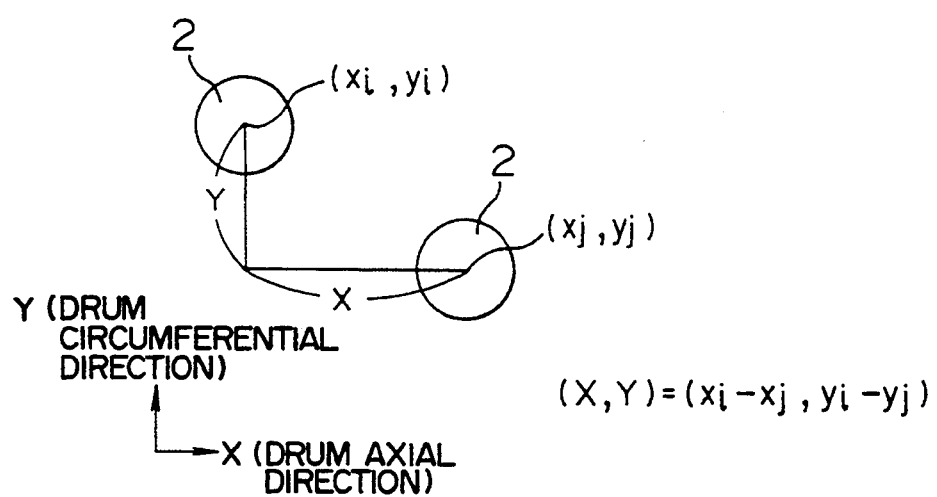
FIG. 7 is a diagram of the concept of the dimple distribution density.
Figure 8:
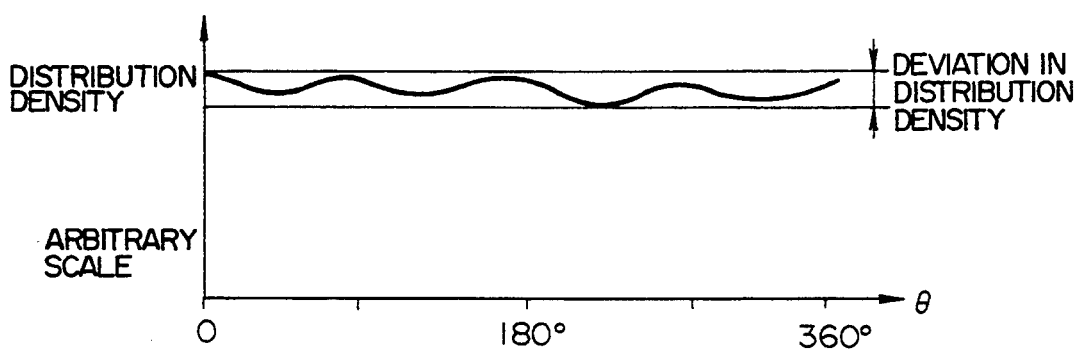
FIG. 8 is a diagram of the result of analysis of the dimple distribution density in a case where there is an irregular deviation in the dimple distribution density.
Figure 9:
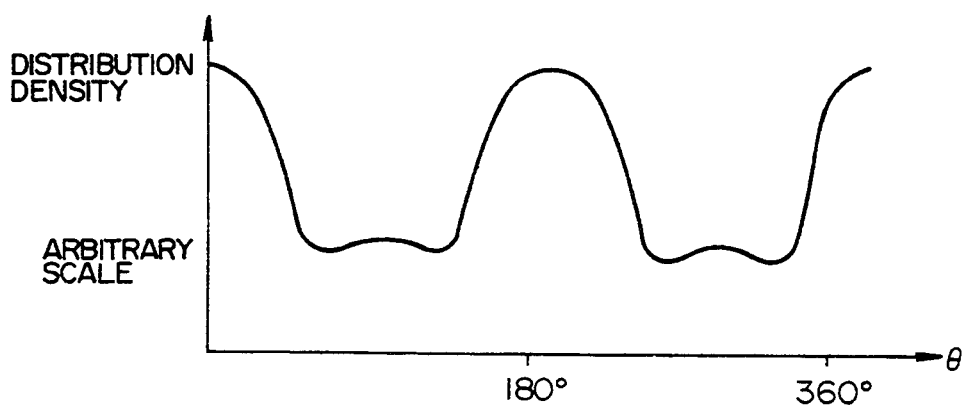
FIG. 9 is a diagram of the result of analysis of the dimple distribution density in a case where there is a periodicity in the deviation of the dimple distribution density in the axial direction of the drum.
Figure 10:
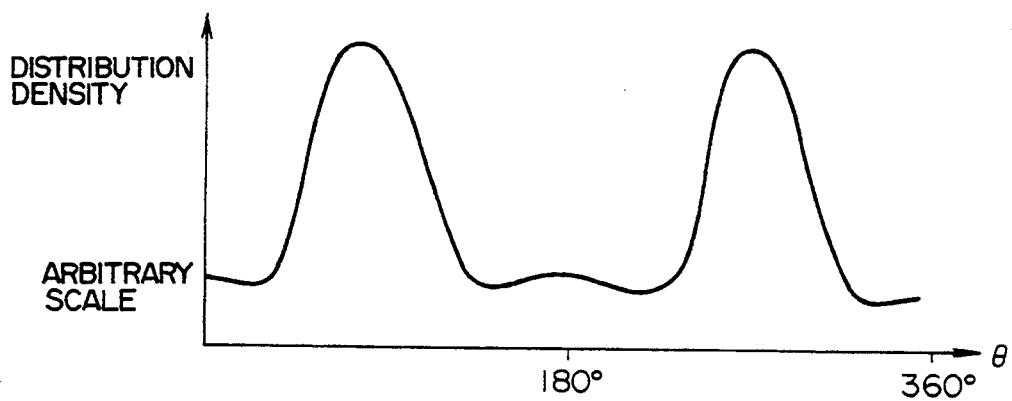
FIG. 10 is a diagram of the result of analysis of the dimple distribution density in a case where there is a periodicity in the deviation of the dimple distribution density in the circumferencial direction of the drum.

FIG. 6 shows a second embodiment of the dimple forming apparatus of the present invention. The difference between this embodiment and the first embodiment shown in FIG. 1 will be described below. In the embodiment shown in FIG. 6, a pair of galvano mirrors 12a and an additional triangular mirror 15 are disposed in a processing head 11. Two laser beams 10a from a pair of laser oscillators 10 are led through two laser beam expanders 16 to the galvano mirrors 12a in the processing head 11. The laser beams are reflected by these mirrors to the additional mirror 15, are then reflected to the lens 13 by two reflecting surfaces of the mirror 15 and are then focused onto the peripheral surface of the drum 1 by the lens 13.

Figure 11:
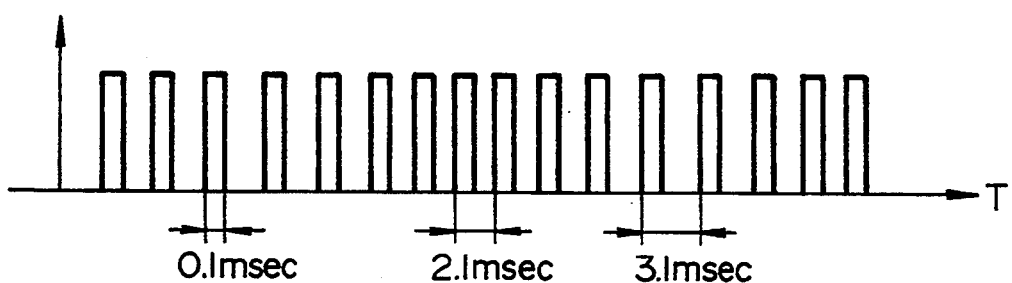
FIG. 11 is a diagram of various pulse intervals employed in an example of modulation of the period of laser beam oscillation.

The processing head 11 is reciprocatingly driven in the axial direction of the drum 1 as in the first embodiment. A drive unit for this reciprocative driving is not illustrated in FIG. 6, but the direction of this reciprocative driving is indicated by an arrow X. The lens 13 can also be moved in a direction perpendicular to the axial direction of the drum 1 to adjust the position of its focal point. A drive unit for this movement is not shown in FIG. 6, but the direction of this movement is indicated by an arrow Y. The dimple forming apparatus is constructed such that the movement of the processing head 11 in the direction of arrow X and the movement of the lens 13 in the direction of arrow Y are controlled by control signals X and Y from a controller 18 while the oscillation period of the two galvano mirrors 12a is controlled by control signals P and Q from the controller 18. Also, the controller 18 can modulate the oscillation period of the laser beams 10a as shown in FIG. 11 by controlling the two oscillators 10. The reciprocating movement of the processing head 11 in the direction of arrow X is periodical. The peripheral surface of the rotating drum 1 is thereby scanned in the axial direction of the drum with the laser beams focused from the lens 13 onto the peripheral surface of the drum so that dimples are formed in the drum peripheral surface successively. At this time, the depth and the diameter of the dimples formed can be controlled by controlling the pulse energy of the laser beams and the irradiation area.

A wavelength of 0.53 to 1.07 μm is selected as the laser beam wavelength. This is because the drum 1 to be worked is ordinarily formed of copper or nickel, the absorption coefficient is excessively low with respect to laser beam having a wavelength exceeding 1.07 μm and efficient processing cannot be achieved by such laser beam and because, at a wavelength shorter than 0.53 μm, processing is mainly effected based on a chemical reaction unlike thermal processing by laser having a wavelength longer than 0.53 μm and thus working cannot be performed efficiently.

The modulation of the period of the laser oscillation and the scanning of the drum surface in the drum axial direction with the laser beams are performed for the purpose of determining the dimple formation positions with an irregularity, because this is effective to suppress the occurrence of surface waves on the molten metal. This method enables a processing such that a deviation in the dimple distribution density required for suppressing surface waves in the molten metal is less than 20% and that the deviation is irregular, which effect could not be realized by the conventional laser processing.

In modulating the laser oscillation period while periodically scanning the drum surface in the drum axial direction with the laser beams, it is preferable to set the least minimum multiple of the frequency (Hz) of the period of modulation of laser pulses and the frequency (Hz) of the period of axial scanning to $10^4$ or greater. This is because, with a value less than that, the deviation in the distribution density is greater than 20% and a sufficient surface wave suppressing effect based on the irregular distribution of dimples cannot be obtained.

EXPERIMENTAL EXAMPLE 3

To form dimples on a drum for casting thin cast strip, two YAG lasers each having a wavelength of 1.06 μm were used, the energy per pulse of the output from each laser was set to 90 mJ and the divergence angle was set to 3 mrad. The laser oscillation frequency was set to 320 to 480 Hz and was modulated at a modulation period of 60 Hz. The oscillation period of the galvano mirrors was 293 Hz and the swinging angle of the galvano mirrors was 0.34 degree. Irradiation was effected such that the angles at which the laser beams were incident upon a focusing lens (f=50 mm) were ±5 degrees and such that the average of the distances between the centers of dimples formed was 140 μm. Irregular dimples having a diameter of 120 μm and a depth of 250 μm were formed with a density distribution deviation of less than 5%. SUS 304 thin cast strips having a thickness of 5 mm and having good surface characteristics could be manufactured by using the drum with dimples thus formed.

INDUSTRIAL APPLICABILITY

According to the first embodiment of the dimple forming apparatus and the method of the present invention, as is apparent from the above description, the diameter and the depth D of dimples 2 formed in the peripheral surface of a drum 1 for casting thin cast strips and the distance between adjacent dimples 2 can be suitably controlled. According to the second embodiment, the deviation in the density of distribution of the dimples 2 formed can be controlled. Thus, the present invention can provide a cooling drum effective to continuously casting thin cast strips having good surface characteristics.

What is claimed is:

1. A method of forming a multiplicity of dimples in a peripheral surface of a cooling drum for casting thin cast strips, comprising the steps of:
   rotating the drum about an axis thereof;
   irradiating the peripheral surface of the drum with at least one laser beam having a wavelength of 0.30 to 1.07 μm to form dimples in the peripheral surface; and
   controlling at least one of the oscillation period of the laser beam, the laser output energy and the beam divergence angle so that each dimple has a depth of no less than 50 μm and a diameter not greater than 500 μm, and so that the distance between the centers of each adjacent pair of the dimples ranges from 1.05 times to 5 times the dimple diameter.

2. A dimple forming method according to claim 1, wherein the height of a rim formed on the periphery of each dimple formed in the peripheral surface of the drum is controlled so as to be not greater than 1/50 of the depth of the dimple.

3. A dimple forming method according to claim 1, wherein a plurality of laser oscillators are used and laser beams emitted from the laser oscillators are condensed by at least one condenser means.

4. A dimple forming method according to claim 1, wherein one laser oscillator is used, a laser beam emitted from the laser oscillator is condensed by one condenser means, and the condenser means is oscillated at a high speed.

5. A method of forming a multiplicity of dimples in a peripheral surface of a cooling drum for casting thin cast strips, comprising the steps of:
   rotating the drum about an axis thereof;
   irradiating the peripheral surface of the drum with at least one laser beam having a wavelength of 0.30 to 1.07 μm to form dimples in the peripheral surface; and
   controlling at least one of the oscillation period of the laser beam, the laser output energy and the beam divergence angle so that each dimple has a depth of no less than 50 μm and a diameter not greater than 500 μm, and so that the distance between the centers of each adjacent pair of the dimples ranges from 1.05 times to 5 times the dimple diameter,
   wherein the output energy, the pulse width and the divergence angle of the laser are controlled so that the output energy is in the range of from 30 to 100 mJ, the pulse width is approximately 100 nsec, and the divergence angle is not greater than 3 mrad.

6. An apparatus for forming a multiplicity of dimples in a peripheral surface of a cooling drum for casting thin cast strips, comprising:
drive means for rotating the drum about an axis thereof;
at least one laser oscillator for outputting a laser beam having a wavelength of 0.30 to 1.07 μm;
a processing head having at least one bending mirror and at least one condenser lens, said processing head directing the laser beam from said laser oscillator to the peripheral surface of the drum during the rotation of the drum to form dimples in the peripheral surface; and
movement means for moving said processing head in the axial direction of the drum,
wherein the output energy, the pulse width and the divergence angle of the laser are controlled so that the output energy is in the range of from 30 to 100 mJ, the pulse width is approximately 100 nsec, and the divergence angle is not greater than 3 mrad.

7. A cooling drum for casting thin cast strips, wherein a multiplicity of dimples are formed in its peripheral surface, the depth of each dimple is no less than 50 μm, the diameter of each dimple is not greater than 500 μm, and the distance between the centers of each adjacent pair of the dimples ranges from 1.05 times to 5 times the diameter of the dimple, and wherein the density of distribution of dimples expressed in terms of the probability of the existence of dimples in immediate proximity to any dimple has an irregular deviation which is no more than 20%.

8. A method of forming a multiplicity of dimples in a peripheral surface of a cooling drum for casting thin cast strips, comprising the steps of:
rotating the drum about an axis thereof;
irradiating the peripheral surface of the drum with at least one laser beam having a wavelength of 0.53 to 1.07 μm during the rotation of the drum to successively form dimples in the peripheral surface; and
causing an irregular deviation in the density of distribution of the formed dimples by performing at least one of modulating the oscillation period of the laser beam and scanning the peripheral surface of the drum with the laser beam in the axial direction of the drum, and
wherein the density of distribution of dimples expressed in terms of the probability of the existence of dimples in immediate proximity to any dimple has an irregular deviation which is no more than 20%.

9. A dimple forming method according to claim 8, wherein the oscillation period of the laser beam is modulated, the peripheral surface of the drum is scanned with the laser beam in the axial direction of the drum, and the least minimum multiple of the frequency (Hz) of the period of scanning of the laser beam in the axial direction of the drum and the frequency (Hz) of the period in which the oscillation period of the laser beam is modulated is no less than $10^4$.

10. An apparatus for forming a multiplicity of dimples in a peripheral surface of a cooling drum for casting thin cast strips, comprising:
drive means for rotating the drum about an axis thereof;
at least one laser oscillator for outputting a laser beam having a wavelength of 0.53 to 1.07 μm;
optical means for directing the laser beam from said laser oscillator to the peripheral surface of the drum during the rotation of the drum to successively form dimples in the peripheral surface;
laser modulation means for modulating the oscillation period of the laser beam by controlling said laser oscillator;
scanning means for scanning the peripheral surface of the drum in the axial direction thereof with the laser beam directed to the peripheral surface of the drum; and
a scanning controller for controlling said scanning means;
wherein at least one of the modulation of the oscillation period of the laser beam and the scanning of the peripheral surface of the drum in the axial direction of the drum is performed to cause an irregular deviation in the density of distribution of the dimples to be formed, and
wherein the density of distribution of dimples expressed in terms of the probability of the existence of dimples in immediate proximity to any dimple has an irregular deviation which is no more than 20%.

11. A dimple forming method according to claim 5, wherein the height of a rim formed on the periphery of each dimple formed in the peripheral surface of the drum is controlled so as to be no greater than 1/50 of the depth of the dimple.

12. A dimple forming method according to claim 5, wherein a plurality of laser oscillators are used and laser beams emitted from the laser oscillators are condensed by at least one condenser means.

13. A dimple forming method according to claim 5, wherein one laser oscillator is used, a laser beam emitted from the laser oscillator is condensed by one condenser means, and the condenser means is oscillated at a high speed.

* * * * *